United States Patent Office 2,903,462
Patented Sept. 8, 1959

2,903,462

POLYPYRAZOLONE PIGMENTS

Wilhelm Schmidt-Nickels, Little York, N.J., and Carl Mayn Smith, White Bear Lake, Minn., assignors to General Aniline & Film Corporation, New York, N.Y., a corporation of Delaware No Drawing. Application December 23, 1957
Serial No. 704,335

15 Claims. (Cl. 260—310)

This invention relates to novel polypyrazolone pigments and to methods for producing same. More particularly, the pigments of the instant invention are compounds having the formula

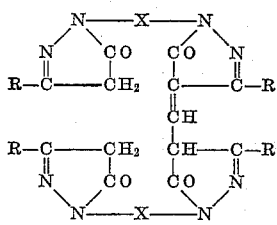

wherein X is selected from the group consisting of naphthylene, bi-phenylene and bis-phenylene-methane; and R is selected from the group consisting of lower alkyl and aryl. It has been found that the above described novel compounds comprise a group of oil and water insoluble pigments having properties which render them suitable for use in natural and synthetic resins, rubber, inks, paints, lacquers, enamels and other film-forming and coating compositions, in pigmentation of fibers and films by incorporation into the spinning solutions, in paper and in other common pigment applications.

In the above formula X may be naphthylene such as 1,4-naphthylene and 1,5-naphthylene, biphenylene and bis-phenylene-methane. R may be lower alkyl such as methyl, ethyl, butyl, isobutyl, amyl, isoamyl and the like, and aryl such as phenyl, 1-naphthyl and 2-naphthyl, and inert substituted derivatives thereof. Examples of inert substituents mentioned above include halo such as chloro and bromo, and alkyl such as methyl and ethyl and the like.

The compounds of the above formula may be prepared by reacting two molecular equivalents of a bis-pyrazolone having the formula

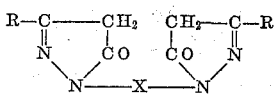

wherein X and R have the values given above, with one molecular equivalent of a methylidyne donor linking agent. The following methods may be employed:

(1) Heating an alkaline solution of the bis-pyrazolone with chloroform.
(2) Heating the bis pyrazolone with a dialkoxymethyl carboxylate such as diethoxymethyl acetate.
(3) Heating the bis pyrazolone with an ester of orthoformic acid such as ethylorthoformate, alone or in glacial acetic acid.
(4) Heating the bis pyrazolone with formamide.

Of these methods, the third method is preferred, in view of the ease and efficiency of operation, availability of materials, and reproducibility of results. In carrying out these reactions, the reactants may be heated at from about 50–220° C. for about one-half to 8 hours, depending upon the particular method employed, the reactants involved, and the like.

The above mentioned bis-pyrazolones employed as reactants in the above described process are for the most part well-known in the art, such compounds and their methods of production being disclosed for example in U.S. Patent No. 2,538,180, and German Patents 264,287, 289,290 (Example 3) and 515,782 (Example 4). In general, such bis-pyrazolones are made by reaction of two moles of a keto ester of the formula $$RCO-CH_2-COOR^1$$

with one mole of a bis hydrazine of the formula $H_2N-HN-X-NH-NH_2$ wherein X and R have the values given above and $R^1$ is lower alkyl such as methyl, ethyl or the like, preferably in the form of a melt, if desired with addition of a few drops of glacial acetic acid.

As some specific examples of keto esters which may be employed in making the bis-pyrazolones there may be mentioned the methyl and ethyl esters of acetoacetic acid, benzoylacetic acid, 1-naphthoylacetic acid, 2-naphthoylacetic acid, and the like.

As examples of bis hydrazines which may be employed in making the bis-pyrazolones, there may be mentioned:

4,4'-dihydrazino-diphenyl,
4,4'-dihydrazino-3,3'-dimethyl-diphenyl,
4,4'-dihydrazino-diphenyl-methane,
4,4'-dihydrazino-3,3'-dimethyl-diphenyl-methane,
4,4'-dihydrazino-3,6,3',6'-tetramethyl-diphenyl-methane,
4,4'-dihydrazino-3,3'-dichloro-diphenyl-methane,
1,5-dihydrazino-naphthalene, and the like.

The above dihydrazines may be made in known manner by diazotization of the corresponding diamines of the formula $N_2H-X-NH_2$ and reduction of the resulting tetrazotized diamines with stannous chloride or with sodium bisulfite. The dihydrazines thus have the formula $H_2N-NH-X-NH-NH_2$.

As is well recognized in the dyestuff and pigment art, improved pigmentary properties are obtained when the initial reactants are as pure as possible. Thus, improved results are obtained when the bis-pyrazolone reactant is first purified, as for example by recrystallization from an organic solvent such as dichlorobenzene, trichlorobenzene or the like.

The pigments of the instant invention may be employed as such or prepared for the market in known manner depending upon the intended use thereof. Thus, a representative paste suitable for use in inks, paints and the like may be made by ball-milling the pigment paste for a number of hours with 50% Tamol NNO (sodium salt of sulfonated naphthalene formaldehyde condensate) on the weight of the pigment.

In the following examples, parts are by weight unless otherwise indicated, parts by weight are in grams and parts by volume are in cc. These examples are illustrative of the instant invention and are not to be regarded as limitative:

Example 1

A charge of 35 parts by volume glacial acetic acid and 6.9 parts by weight 1,1'-(biphenylene-4,4')-bis-(3-methylpyrazolone-5) is heated under agitation under a reflux condenser to 110° C. at which temperature 3.3 parts by volume ethylorthoformate are dropped into the mixture during 16 minutes. The mass turns yellow. Finally the charge is stirred at 110° C. for 1 hour. It becomes quite thick. The reaction product is filtered off, washed with glacial acetic acid, acetone and dried, The compound is a yellow pigment, insoluble in water and organic solvents. It has the structural formula

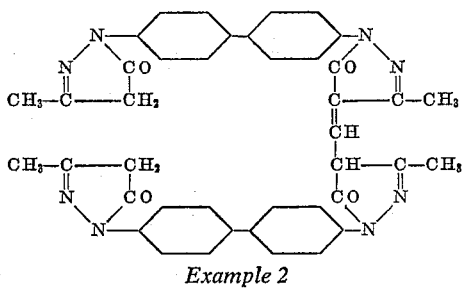

*Example 2*

A charge of 30 parts by volume formamide and 4.4 parts by weight 1,1'-(biphenylene-4,4')-bis-(3-phenyl-pyrazolone-5) is heated under agitation under a reflux condenser to 176° C. within 17 minutes and then stirred at 176° C. to 182° C. for 20 minutes. The reaction product is filtered off at room temperature, washed with formamide, methyl alcohol, acetone and dried. The compound is a yellow pigment, insoluble in water and organic solvents. It has the structural formula

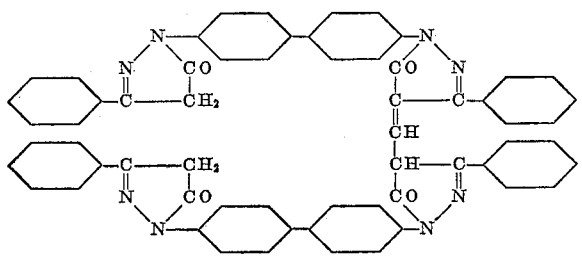

*Example 3*

A charge of 100 parts by volume formamide and 10 parts by weight 1,1'-(bis-phenylene-methane-4,4')-bis-(3-methyl-pyrazolone-5) is heated under agitation under a reflux condenser to 160° C. within 43 minutes and then stirred at 160° C. to 175° C. for 12 minutes. The reaction product is filtered off at room temperature, washed with formamide and dried. The compound is a yellow pigment, insoluble in water and organic solvents. It has the structural formula

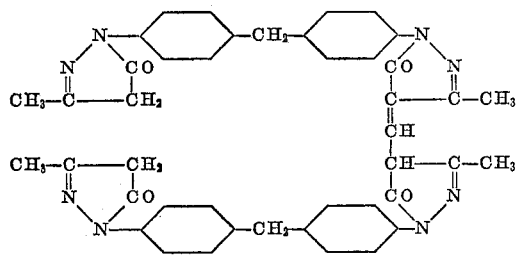

*Example 4*

A charge of 30 parts by volume glacial acetic acid, 6 parts by weight 1,1'-(bis-phenylene-methane-4,4')-bis-(3-methyl-pyrazolone-5) and 2.8 parts by volume ethyl-orthoformate is heated under agitation under a reflux condenser to 95° C. within 40 minutes and then stirred at 95° C. to 100° C. for 30 minutes. The reaction product is filtered off at room temperature, washed with glacial acetic acid, acetone and dried. The compound is a yellow pigment, insoluble in water and organic solvents. It has the same structural formula as the product of Example 3.

*Example 5*

A charge of 30 parts by volume glacial acetic acid, 8.1 parts by weight 1,1'-(bis-phenylene-methane-4,4')-bis-(3-phenyl-pyrazolone-5) (obtained by reacting 4,4'-di-hydrazino-diphenyl-methane with ethyl benzoyl acetate), and 2.8 parts by volume ethylorthoformate is heated under agitation under a reflux condenser to 105° C. within 15 minutes and then stirred at 100° C. to 105° C. for 1 hour. The reaction product is filtered off at room temperature, washed with glacial acetic acid, acetone and dried. The compound is a yellow pigment, insoluble in water and organic solvents. It has the structural formula

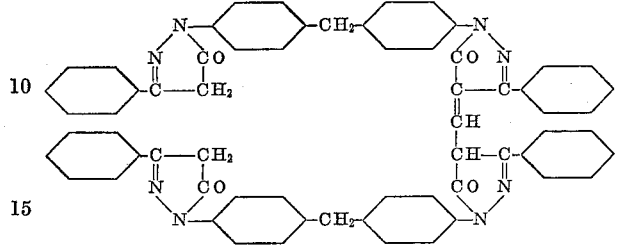

*Example 6*

A charge of 100 parts by volume formamide and 10 parts by weight 1,1'-(bis-phenylene-methane-4,4')-bis-(3-phenyl-pyrazolone-5) is heated under agitation under a reflux condenser to 170° C. within 30 minutes and then stirred at 170° C. to 187° C. for 20 minutes. The reaction product is filtered off at room temperature, washed with formamide, acetone and dried. The compound is a yellow pigment, insoluble in water and organic solvents. It has the same structural formula as the product of Example 5.

*Example 7*

A charge of 165 parts by volume ethylorthoformate and 11 parts by weight 1,1'-(biphenylene-4,4')-bis-(3-phenyl-pyrazolone-5) is heated under agitation to 143° C. during 50 minutes. The ethyl alcohol which forms in the reaction is allowed to distill off through a downward condenser. When the temperature 143° C. is reached the condenser is placed in reflux position and the charge agitated at 140 to 143° C. for 35 minutes. The reaction product is filtered off hot, washed with ethylorthoformate, acetone and dried. The compound is a yellow pigment, insoluble in water and organic solvents. It has the same structural formula as the product of Example 2.

This invention has been disclosed with respect to certain preferred embodiments, and there will become obvious to persons skilled in the art various modifications, equivalents or variations thereof which are intended to be included within the spirit and scope of this invention.

We claim:

1. A compound having the formula

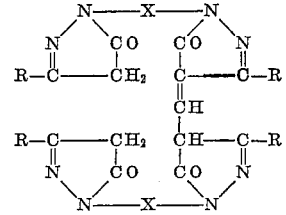

wherein X is selected from the group consisting of naphthylene, biphenylene and bis-phenylene-methane; and R is selected from the group consisting of lower alkyl, phenyl and naphthyl radicals.

2. A compound of the formula.

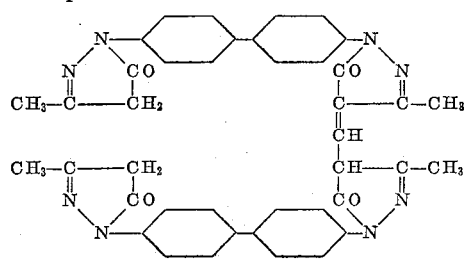

3. A compound of the formula

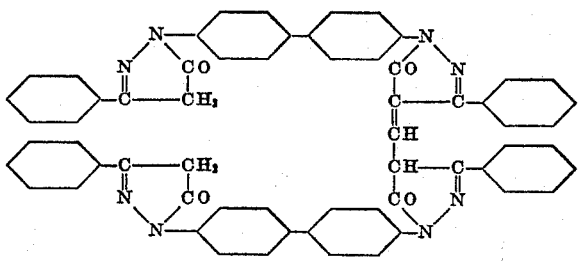

4. A compound of the formula

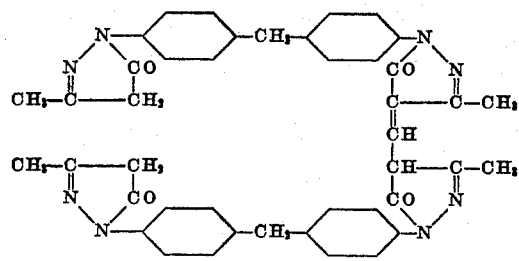

5. A compound of the formula

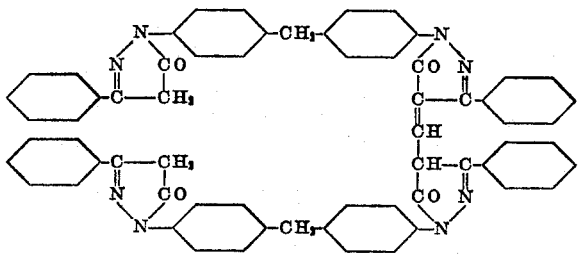

6. A process for producing a compound as defined in claim 1 comprising reacting by heating 2 moles of a bis-pyrazolone of the formula

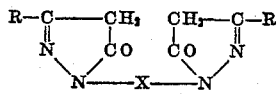

wherein X is selected from the group consisting of naphthylene, biphenylene and bis-phenylene-methane; and R is selected from the group consisting of lower alkyl, phenyl and naphthyl radicals with one mole of a methylidyne donor linking agent selected from the group consisting of chloroform, dialkoxymethyl carboxylates, orthoformic acid esters, and formamide.

7. A process as defined in claim 6 wherein the methylidyne donor linking agent is formamide.

8. A process as defined in claim 6 wherein the methylidyne donor linking agent is ethylorthoformate.

9. A process for producing a compound as defined in claim 2 comprising reacting by heating 2 moles of 1,1'-(biphenylene-4,4')-bis-(3-methyl-pyrazolone-5) with one mole of ethylorthoformate.

10. A process for producing a compound as defined in claim 3 comprising reacting by heating 2 moles of 1,1'-(bi-phenylene-4,4')-bis-(3-phenyl-pyrazolone-5) with one mole of formamide.

11. A process for producing a compound as defined in claim 4 comprising reacting by heating 2 moles of 1,1' - (bis - phenylene-methane - 4,4') - bis - (3 - methyl-pyrazolone-5) with one mole of formamide.

12. A process for producing a compound as defined in claim 4 comprising reacting by heating 2 moles of 1,1'-(bis - phenylene - methane - 4,4') - bis - (3 - methyl-pyrazolone-5) with one mole of ethylorthoformate.

13. A process for producing a compound as defined in claim 5 comprising reacting by heating 2 moles of 1,1'-(bis - phenylene - methane - 4,4') - bis - (3 - phenyl-pyrazolone-5) with one mole of formamide.

14. A process for producing a compound as defined in claim 5 comprising reacting by heating 2 moles of 1,1'-(bis-phenylene - methane - 4,4') - bis - (3 - phenyl-pyrazolone-5) with one mole of ethylorthoformate.

15. A process for producing a compound as defined in claim 3 comprising reacting by heating 2 moles of 1,1' - (biphenylene - 4,4') - bis - (3 - phenyl - pyrazolone-5) with one mole of ethylorthoformate.

References Cited in the file of this patent

UNITED STATES PATENTS 2,011,256   Ostromislensky _____ Aug. 13, 1935

FOREIGN PATENTS 603,753   Great Britain _____ June 22, 1948